United States Patent
Nell et al.

[11] Patent Number: 5,367,942
[45] Date of Patent: Nov. 29, 1994

[54] BRAKE PRESSURE CONTROL DEVICE FOR A ROAD VEHICLE

[75] Inventors: Joachim Nell, Ostfildern; Manfred Steiner, Winnenden; Georg Coermann, Stuttgart, all of Germany

[73] Assignee: Mercedes-Benz AG, Germany

[21] Appl. No.: 134,839

[22] Filed: Oct. 12, 1993

[30] Foreign Application Priority Data

Oct. 9, 1992 [DE] Germany .................. 4234041

[51] Int. Cl.⁵ .................................................. F15B 9/10
[52] U.S. Cl. ........................... 91/369.2; 91/376 R; 92/98 R
[58] Field of Search ............... 91/369.1, 369.2, 376 R; 92/96, 98 R, 99, 101; 60/547.1

[56] References Cited

U.S. PATENT DOCUMENTS

| | | | |
|---|---|---|---|
| 4,905,571 | 3/1990 | Dehoff et al. | 91/376 R X |
| 5,012,723 | 5/1991 | Gauthier | 91/369.2 X |
| 5,014,597 | 5/1991 | Rueffer et al. | 91/369.2 |
| 5,083,495 | 1/1992 | Satoh | 91/369.2 |
| 5,105,721 | 4/1992 | Furuta et al. | 91/376 R X |
| 5,115,718 | 5/1992 | Gautier et al. | 91/369.2 |
| 5,146,837 | 9/1992 | Inoue | 91/376 R X |

FOREIGN PATENT DOCUMENTS 2265195 9/1993 United Kingdom .............. 91/376 R

OTHER PUBLICATIONS

Abstract of Germany 4208496, Sep. 1993.

*Primary Examiner*—Edward K. Look
*Assistant Examiner*—Hoang Nguyen
*Attorney, Agent, or Firm*—Evenson, McKeown, Edwards & Lenahan

[57] ABSTRACT

A brake pressure control device for a road vehicle with a hydraulic brake system has a pneumatic braking force amplifier which is provided with a switch-over device which switches ever the braking force amplifier to operation with increased amplification factor when the speed with which the driver actuates the brake pedal exceeds a threshold value $\phi_s$. In the axial force transmission train leading from the brake pedal via a reaction piston of the control part, via a reaction element and via the actuating piston of the braking force amplifier to the main cylinder. A rigid force transmission element is in mechanical parallel connection to a flexible transmission element and associated with which there is a position engaged in the force transmission train as the basic position for the judicious braking operation, and an actuation device, which responds when the threshold value $\phi_s$ of the pedal actuation speed is exceeded and then disengages the distance piece from its supporting position.

18 Claims, 6 Drawing Sheets

BRAKE PRESSURE CONTROL DEVICE FOR A ROAD VEHICLE

BACKGROUND AND SUMMARY OF THE INVENTION

The present invention relates to a brake pressure control device for a road vehicle with hydraulic multi-circuit brake system.

Such a brake pressure control device in a brake system for generating brake pressures to be coupled into the wheel brakes, a main cylinder is provided which can be actuated by a pedal controlled pneumatic braking force amplifier to the brake pressure control device is also provided in the system and has a switch-over device which responds to the actuation behavior of the driver and causes the braking force amplifier to be automatically switched over from a value of the amplification factor meeting the requirement for judicious braking to a higher value of the amplification factor meeting the requirement for full braking at least in the case where the speed with which the driver actuates the brake pedal in the introductory phase of a braking action exceeds a threshold value $\dot{\phi}_s$. Such a brake pressure control device is described in DE 42 08 496 C1.

In such a brake pressure control device, the vacuum braking force amplifier is provided with a magnetic valve arrangement which can be driven, by triggering via an electrical output signal of the electronic control unit, from a basic position, in which a control passage, via a pressure balance can take place between the vacuum chamber and the actuation chamber of the braking force amplifier, of the control part of the braking force amplifier is in communicative connection with the vacuum chamber but the actuation chamber is shut off from the external atmosphere, into an excited functional position, in which the actuation chamber of the braking force amplifier is subjected to ambient pressure via a flow path, which is freed in this functional position, of the magnetic valve arrangement, but the control passage is shut off from the vacuum chamber. The basic position of the magnetic valve arrangement is associated with the non-actuated condition of the brake system and with its judicious braking operation. The valve arrangement is switched over its excited position when, during actuation of the brake pedal, the threshold value $\dot{\phi}_s$ of the actuation speed is exceeded. The control passage of the control part is led to the outside via a flexible conduit and a lead-through of the vacuum chamber casing. The magnetic valve is arranged in the outer space of the vacuum chamber and, in its basic position, connects this lead-through to a second lead-through leading back into the vacuum chamber. In the excited functional position of the magnetic valve taken up in the case of triggering by an output signal characteristic of the threshold value $\dot{\phi}_s$ of the brake pedal actuation speed being exceeded, the first lead-through is shut off from the second lead-through through and is instead connected to the external atmosphere so that the braking force amplifier operates with maximum braking force amplification.

The known brake pressure control device thus far explained is subject, from the functional point of view, to the disadvantage that when the switch-over device responds, the increase in braking force takes place abruptly, and, for a minimum response time, it is practically impossible for the driver to influence the braking force. This can substantially impair a braking operation, at least with respect to driving comfort. A disadvantage from the engineering point of view is that the magnetic valve arranged outside the casing of the braking force amplifier requires substantial installation space which can scarcely be provided in the case of the conventional arrangement of the amplifier/main cylinder unit in the upper, rear part of the engine compartment, where the hydraulic unit of an anti-lock brake system, which is necessary in combination with the brake pressure control device, is also accommodated in many instances.

An object of the present invention, therefore, is to improve a brake pressure control device of the aforementioned type to achieve improved response behavior in the sense of better metering of the braking force and vehicle deceleration with a low space requirement at the same time.

This object has been achieved in a brake pressure control device by providing a rigid force transmission element in mechanical parallel connection to a flexible transmission element in the axial force transmission train, leading from the brake pedal via the reaction piston of the control part, via the reaction element and via the actuation piston of the braking force amplifier to the main cylinder, for the control and actuation forces and for the reaction force resulting from the actuation of the main cylinder, to provide the driver with feedback on the functional condition of the brake system. The force transmission element is associated with a position engaged in the force transmission train as the basic position for judicious braking operation. In that basic position, the rigid force transmission element provides the function of a distance piece between two force transmission train elements following sequentially in the force path direction. A switch-over device is provided for the distance piece to respond when the threshold value ($\dot{\phi}_s$) of the pedal actuation speed is exceeded and to then disengage the distance piece from its supporting position, thereby freeing a displacement path within which the reaction piston of the control part can be displaced against a reduced return force in the sense of a pressure build-up control of the control part.

An advantageous feature of the brake pressure control device according to the present invention resides in the fact that, after the switch-over device responds, the braking force remains proportional to the control force with which the driver wishes to select a certain vehicle deceleration. Consequently, the braking force can also continue to be metered. Another advantage is that the functional elements necessary for providing the switch-over device can be realized with little installation volume and can be integrated without difficulty into the control part of the braking force amplifier which, including the brake pressure control device, consequently requires no more installation volume than a conventional brake unit.

If the reaction element is configured as an elastic or quasielastic disc which, shut into an axially limited space by the pressure rod at one end and the reaction piston at the other, behaves approximately as a hydraulic medium, particularly simple and functionally reliable embodiments of the switch-over device of the brake pressure control device can be achieved.

In other embodiments of such switch-over devices utilizing a two-part flange arrangement, the pressure rod providing the transmission of the actuation force to the main cylinder of the brake system is axially supported on the reaction disc of the braking force amplifier. The flange elements of this flange arrangement are axially supported on one another by a distance piece, whose disengagement from the support position makes it possible to switch the amplifier over to a higher value of the amplification factor. A particularly simple embodiment of an actuation device, necessary in this respect, as a control magnet, is also provided.

If the distance piece has an obliquely extending free end surface with the inclined orientation in accordance with one contemplated embodiment and arrangement relative to the flange elements, it is suitable for achieving reliable support of the flange elements on one another. At the same time, it will permit small disengagement strokes of the distance piece because, from a minimum amount of the disengagement stroke of the distance piece from its support position, the disengagement from the same is assisted by the displacement of the flange element carrying the distance piece.

In combination therewith, the present invention provides a particularly advantageous embodiment of the flange part acting on the distance piece with spherical-shaped embodiment, complementary, so to speak, to the inclination of the free end surface of the distance piece, of the flange part assisting the disengagement movement of the distance piece.

Instead of a distance piece which can be disengaged radially out of its support position, which provides a rigid support of the flange parts on one another, a distance piece can be used which cannot be disengaged axially but can be rotated is provided with a profile on its side facing towards the axially displaceable flange part. This profile, rotated into the same orientation as a complementary profile of the movable distance piece, permits the movable distance piece to escape in the axial direction and thereby permits operation of the braking force amplifier with an increased amplification factor. In the basic position of the rotatable distance piece associated with partial braking operation, this rotatable distance piece is "twisted" relative to the movable flange element so that the distance piece and the movable flange part are in contact with one another by the outer, flat envelopes of their profiles. The stroke region becoming free due to twisting of the distance piece is then equal to twice the profile depth of the individual profiles. In a very simple embodiment of such profiles, the rotatable distance piece is, for example, provided with a radial groove and the movable flange part is provided with a radial rib.

Instead of a rotatable distance piece embodied in block form, it is also possible to provide a sleeve-shaped distance piece, which surrounds the axially movable flange part coaxially over a section of its length and has an elongated linkage opening extending obliquely to the direction of movement of the movable flange part. A radial drive trunnion is in engagement with the movable flange part by way of this linkage opening so that an axially fixed support, which can bear loads, can be achieved in the rotational, basic position of the distance piece associated with the partial braking operation because the linkage opening has a short end section extending in the peripheral direction. Consequently, the drive trunnion can be supported on an edge of the sleeve opening extending transverse to the displacement direction of the movable flange part.

Stepper motors, whose rotors are torsionally connected to the respective distance piece and which can be rotated within a limited angular range, are particularly;suitable as rotary drives for the switch-over devices with rotatable distance pieces. Such stepper motors can be realized with advantageously small dimensions in both the axial direction and the radial direction. When such stepper motors are used, it is also possible to electrically control both the disengagement movement and the engagement movement of the respective distance piece out of and into the support position.

Instead of, or in addition to, a two-part flange arrangement of the pressure rod, a two-part reaction piston arrangement can be provided which includes a first reaction piston element, which acts centrally on the reaction disc and on which the pedal push-rod acts, and a second reaction piston element, which is configured as an annular piston and is axially supported on the reaction disc by means of an end surface coaxially surrounding the central surface region where the first reaction piston element acts on the reaction disc, as another embodiment of the switch-over device which permits sensitive metering of the braking force even when the braking force amplifier is operated with its increased amplification factor.

In another preferred embodiment of the switch-over device, the distance piece is configured as a piston-shaped armature of a control magnet provided as the actuation device. It is thus possible to disengage the distance piece against the action of a return spring when current is supplied to the control magnet. In combination therewith, an embodiment of the reaction piston element accommodating the distance piece facilitates the integration of the actuation device in the reaction piston element.

BRIEF DESCRIPTION OF THE DRAWINGS

These and other objects, features and advantages of the present invention will become more apparent from a following detailed description thereof when taken in conjunction with the accompanying drawing wherein.

DETAILED DESCRIPTION OF THE DRAWINGS

Figure 1:
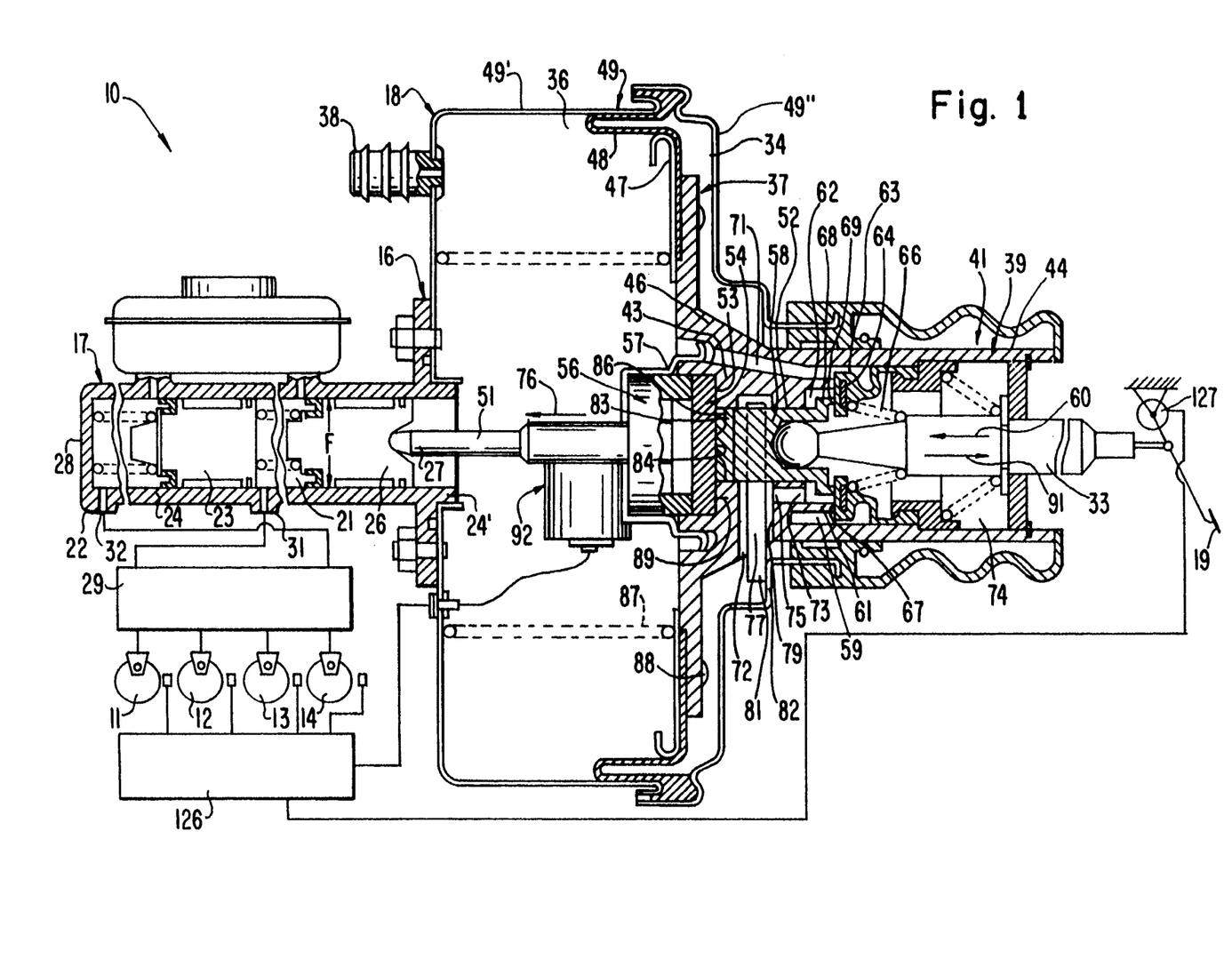
FIG. 1 shows a schematic representation, particularly in cross-section, of a road vehicle brake system equipped with a brake pressure control device for explanation of the function of the brake pressure control device.

In FIG. 1, a hydraulic twin-circuit brake system of a road vehicle, represented by this and otherwise not shown, is indicated generally by the numeral 10. A brake pressure control device is integrated into this twin-circuit brake system 10 to recognize from the way in which the driver actuates the brake system whether the driver intends to carry out judicious braking with moderate vehicle deceleration or full braking with the highest possible vehicle deceleration and, in the latter case, automatically to control the development of the highest possible braking force, which the driver could not select, or at least not rapidly enough, by actuation of the brake system 10 alone, i.e. without increasing the auxiliary force.

In the brake system 10, in which the front wheel brakes 11 and 12 are combined in a front axle brake circuit I and the rear wheel brakes 13 and 14 are combined in a rear axle brake circuit II, a brake unit, which is indicated generally by the numeral 16 and is provided for supplying brake pressure to the brake circuits I and II, includes a static tandem main cylinder 17 and a pneumatic braking force amplifier 18. This brake unit can be actuated by a brake pedal 19 which the driver uses to select the vehicle deceleration corresponding to his requirement during a braking operation.

The tandem main cylinder 17 has a primary output pressure space 21 associated with the front axle brake circuit I and a secondary output pressure space 22 associated with the rear axle brake circuit II. The pressure spaces 21, 22 are bounded relative to one another in a pressure-tight and axially movable manner within the casing 24 of the main cylinder 17 by a floating piston 23. The second axially movable boundary of the primary output pressure space 21 is formed by a primary piston 26, on which the actuation force amplified by the pneumatic braking force amplifier 18 acts via a pressure rod 27. The second axial boundary of the secondary output pressure space 22 is formed by an end wall 28 of the main cylinder casing 24.

It is also assumed that the vehicle is equipped with a conventional anti-lock brake system which, if required, provides a brake pressure control compatible with the dynamically stable behavior of the vehicle during braking. The brake pressure control also leads to optimum or at least approximately optimum vehicle deceleration.

The anti-lock brake system is schematically represented in FIG. 1 by its hydraulic unit 29 which is connected between the pressure outputs 31, 32 of the tandem main cylinder 17 associated with the two brake circuits I and II, and the front wheel brakes 11, 12 as well as the rear wheel brakes 13, 14, and includes brake pressure control valves (not shown) which can be electrically triggered and return pumps associated with the brake circuits I and II.

An explanation in more detail of this anti-lock brake system 29, which can be realized in any known manner from the technology of anti-lock brake systems, is not regarded as necessary because any type of antilock brake system is fundamentally suitable in conjunction with the brake pressure control device provided as part of the brake system 10.

The control principle, which is used in the brake pressure control device of the brake system 10 and on which the illustrative embodiments to be explained below are based, consists in switching over the degree of amplification A of the pneumatic braking force amplifier 18. This degree of amplification A is defined as the ratio $K_B/K_S$ of the actuation force $K_B$, which can be exerted via the pressure rod 27 of the braking force amplifier 18 on the primary piston 26 of the tandem main cylinder 17, to the control force $K_S$, which is introduced via the pedal push-rod into the braking force amplifier 18 also essentially in the axial direction. The degree of amplification $A_Z$ is switched over to a value $A_V$, which is higher than the value $A_z$ appropriate to judicious braking, when the driver actuates the brake pedal 19 very rapidly. The braking control device then "recognizes" that the driver wishes to introduce full braking, or at least desires rapid vehicle deceleration. This is intended to provide the braking force amplifier 18 with maximum power at the earliest possible instant during the braking procedure. The resulting high braking force should, if necessary, be limited in conjunction with the anti-lock brake system 29 such that dynamically stable deceleration behavior of the vehicle is ensured.

The construction and function of the braking force amplifier 18 are first considered, before the switch-over devices suitable for switching over to increased amplification factors A of the braking force amplifier 18 are explained in detail using the further FIGS. 2 to 6. This construction and function are used, at least in principle, in all the illustrative embodiments.

The pneumatic braking force amplifier 18 is configured as a single-acting pneumatic cylinder which has an actuating piston 37, which separates an actuation chamber 34 from a vacuum chamber 36 in a pressure-tight and movable manner and acts on the primary piston 26 of the tandem main cylinder 17 via the pressure rod 27. The vacuum chamber 36 of the braking force amplifier 18 is connected to an induction connection (not shown) of the vehicle engine by a connection mouthpiece 38 so that, when the vehicle engine is in operation, a pressure of approximately 0.3 bar prevails in the vacuum chamber 36, i.e. a pressure which is 0.7 bar lower than the atmospheric ambient pressure.

The radially inner, central part of the actuating piston 37 is formed by the essentially cup-shaped casing (indicated overall by the numeral 39) of a control part (indicated overall by the numeral 41) of the braking force amplifier 18. The function of the control part 41 is that of a proportional valve by way of which a pressure proportional to the force $K_P$, with which the driver actuates the brake pedal 19, can be coupled into the actuation chamber 34 of the braking force amplifier 18, the maximum value of this pressure being the ambient pressure (1 bar). The pneumatic braking force amplifier 18 is constructed in such a way that its amplification factor has a value around 4, i.e. the actuation force $K_B$ introduced into the primary piston 26 of the tandem main cylinder 17 via the pressure rod 27 has approximately four times the magnitude of the control force $K_S$ introduced into the control part 41 via the pedal push-rod 33. The control force $K_S$ corresponds in turn to the force $K_P$, with which the driver actuates the brake pedal 19, multiplied by the pedal leverage.

The cup-shaped casing 39 of the control part 41 has a solid, block-shaped bottom 43 from which emerges the outer shell region 44, pointing towards the brake pedal 19, of the cup-shaped casing 39. The other end has a conically expanding flange 46, which points towards the actuating piston 37 of the braking force amplifier 18 and is in contact in a pressure tight manner on the inner edge of the actuating piston 37. The latter is of basically circular disc shape and its outer edge region 47 is tightly connected to the braking force amplifier casing indicated generally by numeral 49, by way of a folded diaphragm 48. In the outermost peripheral edge region, the folded diaphragm 48 provides the boundary between the vacuum chamber 36 and the actuation chamber 34 of the braking force amplifier 18.

The tandem main cylinder 17 is attached, in coaxial arrangement relative to the central longitudinal axis 51 of the braking force amplifier 18, in a pressure-tight manner to the casing part 49' of the braking force amplifier 18. This casing part 49' forms the boundary of the vacuum chamber 36 and is permanently fixed to the casing. The tubular end section 24' of the tandem main cylinder 17 accommodates the primary piston 26 and protrudes into the vacuum chamber 36 of the braking force amplifier 18.

The block-shaped bottom part 43 of the casing 39 has a central passage hole 52 which opens into a flat cup-shaped depression 53 of the control part casing 39 arranged on the side of the latter facing towards the main cylinder 17. A thick-walled, circular disc-shaped elastic reaction element 54 is inserted in the cup-shaped depression 53 and fills the major part of its internal space. This elastic reaction element 54 covers the opening of the passage hole 52 of the block shaped bottom part 43 on the vacuum chamber end and is in large-area contact with the radial annular shoulder of this bottom part 43 surrounding this opening. The contact area of the radial annular shoulder corresponds to three times the clear cross-sectional area of the central passage hole 52 of the bottom part 43.

The pressure rod 27 provided for introducing the actuation force $K_B$ into the brake unit is supported on the reaction element 54 by a flange 56 whose contact area with the reaction disc 54 corresponds to the basic area of the latter. Even in the non-actuated condition of the brake system, the pressure rod 27 is held in contact with the reaction disc 54 by conventional return springs (not shown) of the tandem main cylinder 17 and is secured by a holding sleeve 57 against disengaging from the depression 53 of the block-shaped bottom 43 of the control part casing 39.

A reaction piston indicated generally by the numeral 58, is acted on by the control force $K_S$ in the direction of the arrow 60 by way of the pedal push-rod 33 during an actuation of the brake system 10 and is guided so that it can be axially displaced in the central passage hole 52 of the control part casing bottom 43.

The block-shaped end bottom 43 of the control part casing 39 is provided with an annular groove 59 open towards the pedal side. The radially outer boundary of this annular groove 59 is formed by the inside of the tubular outer shell part of the control part casing 39, its radially inner boundary is formed by an annular rib 61, which forms the radial boundary of a cylindrical cup-shaped depression 62 of the block-shaped end bottom part 43. The passage hole 52 in which the reaction piston 58 is displaceably guided opens centrally within the depression 62.

An annular disc 64 incorporated in a sealing collar 63 is arranged within the region of the outer shell 44 of the control part casing 39 adjacent, in the axial direction, to the annular rib 61. By way of the sealing collar, the annular disc 64 is in sealing contact with the outer shell 44 of the control part casing 39, and the radial offset of the collar 63 permits the plane of the disc to be moved axially so that it can be forced into sealing contact with the narrow, annular end surface 67 of the annular rib 61 of the block-shaped bottom part 43 of the control part casing 39 by way-of a valve spring 66 supported on an annular shoulder of the pedal push-rod 33.

The end section of the reaction piston 58 on the pedal side accommodates the ball end of the pedal push rod 33 in a pocket-hole-shaped depression and protrudes into the cup-shaped depression 62 of the block-shaped bottom part 43. Within this depression, the end section of the reaction piston 58 has, on the pedal side, a radial end flange 68 whose outer diameter is smaller than the inner diameter of the depression 62 bounded by the annular rib 61 but is greater than the inner diameter of the annular disc 64 embedded in the sealing collar 63. In the peripheral region of its end surface facing towards the annular disc 64, the radial end flange 68 of the reaction piston 58 has an annular rib 69 which projects slightly in the axial direction. The reaction piston 58 can be supported, by the annular rib 69, on a radially inner region, acting as a sealing surface, of the annular disc 64 enclosed by the collar 63.

In a radially outer region of its block-shaped bottom part 43, the control part casing 39 is provided with a vacuum passage 71 connecting the vacuum chamber 36 to the annular groove 59. In addition, the block-shaped bottom part 43 is provided with a pocket hole 72 crossing the passage hole 52 of the bottom part 43 and opening at one end into the actuation chamber 34. An eccentric longitudinal hole 73 of the block-shaped bottom part 43 opens into the pocket hole 72 and provides a communicating connection between the latter and the cup-shaped depression 62 of the bottom part 43, which depression 62 is arranged on the side of the bottom part 43 facing towards the annular disc 64. The eccentric longitudinal hole 73 and the pocket hole 72 form, in total, the atmospheric passage 75 via which, when the annular rib 69 of the reaction piston 58 is raised or separated from the annular disc 64, air can flow into the actuation chamber 34 from the internal space 74 of the control part 41. The space 74 is at atmospheric pressure and is bounded radially at the outside by the end section of the casing shell 44 on the pedal side, so that this air reaches a pressure $P_S$ which is higher than the pressure prevailing in the vacuum chamber 36. The effect is that the actuating piston, along with the pressure rod 27 of the braking force amplifier 18, experiences a displacement in the direction of the arrow 76 in FIG. 1, i.e. in the direction of the brake pressure build-up.

The reaction piston 58 is provided with a permanently connected stop bolt 77 which passes in the radial direction through a part of the pocket hole 72 forming the atmospheric passage 75, the clear axial diameter of the pocket hole 72 is larger than the diameter of the stop bolt 77. Possible relative movements of the reaction piston 58 in the axial direction relative to the casing 39 of the control part 41 are limited in one direction by contact between the stop bolt 77 and the radial boundary 78 of the radial pocket hole 72 facing towards the reaction element 54, and in the opposite direction by contact between the stop bolt 77 and the opposite, push-rod-side boundary 79 of the pocket hole 72, at which the eccentric longitudinal hole 73 of the atmospheric passage 72 opens into its radial pocket hole 72.

Also by way of contact between its free end section 81, which protrudes radially from the pocket hole 72, and an annular shoulder 82 of the casing part 49" bounding and fixed to the casing of the actuation chamber 34 of the braking force amplifier 18, the stop bolt 77 provides a pedal-side boundary of the return stroke of the reaction piston 58 associated with a return movement of the brake pedal 19. By virtue of this stop position, the stop bolt 77 also marks the basic position of the reaction piston 58, which the reaction piston 58 takes up before the vehicle engine is switched on and, when the vehicle engine is running, before or at the beginning of a braking action.

The reaction piston 58 is supported on the reaction element 54 by a support element 83 which has a central hump 84 projecting towards the reaction element 54. This central hump 84 is connected by a smooth curve to a radially extending support surface 86 of the support element 83 by way of which the support element 83 can come into contact with the reaction element 54 within the central hole 52, in which the reaction piston 58 is guided so that it can be displaced.

The braking force amplifier 18, which has been explained up to this point and can also be assumed as being conventional, operates as follows:

Before the vehicle engine is started, both the vacuum chamber 36 and the actuation chamber 34 of the braking force amplifier 18 are at atmospheric pressure and the actuating piston 37 of the braking force amplifier is forced into its basic position associated with minimum volume of the actuation chamber 34 by a return spring 87 supported on the bottom of the cup-shaped bottom part 49' which bounds the vacuum chamber 36 and is permanently fixed to the casing 49. This basic position is marked by contact between the bottom part 43 of the control part casing 39 and one boundary 78 (on the reaction element side) of the pocket hole 72 on the stop bolt 77, which is in turn axially supported on the annular shoulder 82 of the casing part 49", forming the boundary and permanently fixed to the casing 49, of the actuation chamber 34 and/or is marked by contact of the actuating piston 37 on support projections 88, of the casing part 49''' bounding the actuation chamber 34 and permanently fixed to the casing 49 arranged at the peripheral edge region 47 of the actuating piston 37.

In the basic position of the actuating piston 37 of the braking force amplifier 18, of the casing 39 of its control part 41 and of its reaction piston 58, the annular disc 64 is supported on the outer annular end surface 67 of the annular rib 61 but is raised from the annular rib 69 of the radial end flange 68 of the reaction piston 58. As a result, the result that the internal space 74 of the casing 39 of the control part 41, which is at atmospheric pressure, communicates via the atmospheric passage, with the actuation chamber 34 but the actuation chamber 34 is shut off from the vacuum chamber 36.

As soon as the vehicle engine is running and the pressure in the vacuum chamber 36 decreases, the actuating piston 37, which is subjected to atmospheric pressure in the actuation chamber 34, experiences a displacement directed towards the main cylinder 17 so that the annular disc 64 also experiences a displacement directed towards the reaction piston 58 which is initially held in its basic position by the preload. This preload, which is exerted by the reaction element 54, still exists but is decreasing. Because of this displacement, the annular disc 64 comes into sealing contact with the axially projecting annular rib 69 of the radial end flange 68 of the reaction piston, so that the connection between the internal space 74 of the control part casing 39, which is at atmospheric pressure, and the actuation chamber 34 of the braking force amplifier 18 is shut off. Because this actuation chamber 34 has been at atmospheric pressure up to this point, a further displacement of the actuating piston 37 takes place, and with it of the control part casing 39, towards the main cylinder 17 so that the outer annular rib 61 of the block-shaped bottom part 43 of the control part casing 39 lifts from the annular disc 64 and communicating connection between the vacuum chamber 36 and the actuation chamber 34 now occurs via the vacuum passage 71, the gap which has become free between the annular disc 64 and the annular rib 61 and the atmospheric passage 75.

Consequently, the actuation chamber 34 is also subjected to vacuum with the result that the return spring 87 can again force the actuating piston 37 back until the equilibrium position shown in FIG. 1 is reached in which the annular disc 64 is in sealing contact both with the outer annular rib 61 of the block-shaped bottom part 43 of the control part casing 39 and with the axially projecting annular rib 69 of the radial end flange 68 of the reaction piston 58. As a result, the vacuum chamber 36 is shut off from the actuation chamber 34 and the latter is shut off from the internal space 74 of the control part casing 39, which is at atmospheric pressure. In this equilibrium position, the pressure prevailing in the actuation chamber 34 is slightly higher than the pressure prevailing in the vacuum chamber 36 which, during operation of the engine, has a typical value of 0.3 bar.

If the brake system 10 is actuated so that, via the pedal push-rod 33, the control force $K_S$ is exerted in the direction of the arrow 60 on the reaction piston 58, the latter experiences a movement relative to the control part casing 39 directed towards the reaction disc 54 so that the axial annular rib 69 of the radial end flange 68 of the reaction piston 58 lifts from the annular disc 64 and, via the annular gap which is freed because there of the internal space 74 of the control part casing 39, which is at atmospheric pressure, communicates via the atmospheric passage 75 with the actuation chamber 34. As a result, the actuating piston 37 of the braking force amplifier 18 is acted upon by a higher pressure on one side. One result of this is a displacement of the pistons 26, 23 of the tandem $P_B$, main cylinder 17, and therefore a build-up of brake pressure which leads to a reaction force KR, which is given by the relationship $$K_R = F \cdot P_B$$

where the effective cross-sectional area of the primary piston 26 of the main cylinder 17 is indicated by F. This reaction force $K_R$ is supported via the flange 56 of the pressure rod 27 and the reaction disc 54 on the circular annulus-shaped area 89, opposite to the flange 56, of the bottom of the flat cup-shaped depression 53 accommodating the disc-shaped reaction element 54. In the central region of the reaction element 54, the effective cross-sectional area $F_k$ of the reaction piston 58 is axially supported on the elastic reaction element 54 so that there is also a reaction force $K_{Sr}$ in the opposite direction to the control force $K_S$, acting on the reaction piston 58. The magnitude of this reaction force $K_{Sr}$ is proportional to the effective cross-sectional area $F_K$ of the reaction piston 58.

Because of the return force $K_{Sr}$, which acts on the reaction piston 58 and whose magnitude increases with increasing magnitude of the brake pressure $P_B$, the reaction piston 58 experiences a displacement relative to the control part casing 39 in the direction of the arrow 91. This brings the axial annular rib 69 of its radial end flange 68 back into contact with the annular disc 64, so that the atmospheric passage 75 is again shut off from the internal space 74 of the control part casing 39, and the pressure in the actuation chamber 34 is held at the value reached when the atmospheric passage 75 was shut off.

In the position thus reached of the reaction piston 58 within the casing 39 of the control part 41, in which both seat valves which are respectively formed by an annular rib 61 or 69 of the casing part 39 or the reaction piston 58 and the annular disc 64, are closed, there is equilibrium between the control force $K_S$ and the reaction force $K_{Sr}$ acting in the opposite direction. That is, there exists an equilibrium position of the reaction piston 58 and the actuating piston 37 of the braking force amplifier 18 which corresponds to an expected value of the vehicle deceleration which the driver wishes to achieve and which is associated with the actuation or control force $K_S$.

Assuming a "hydrostatic" behavior of the reaction disc 54 consisting of a flexible elastomer, the amplification factor A of the pneumatic braking force amplifier 18 arising in the equilibrium condition is given by the following relationship:

$$A = (F_r + F_k)/(F_k),$$

in which the magnitude of the annular area 89, on which the reaction disc 54 is supported on the bottom of the pressure-rod-side depression 53 of the control part casing 39, is indicated by $F_r$ and the effective cross-sectional area of the reaction piston 58, with which the latter acts in the central region of the reaction disc 54, is indicated by $F_k$. By way of illustration, the magnitude $F_r$ of the annular area 89 is approximately three times greater than the cross-sectional area $F_k$ of the reaction piston 58, and the value of the amplification factor A is, therefore, around 4.

If the driver, starting from an equilibrium position of the reaction piston 58 and of the brake pedal 19 corresponding to a desired vehicle deceleration, withdraws the actuation force, the reaction piston 58 experiences a displacement relative to the control part casing 39 so that the annular disc 64, "entrained" as it were by the reaction piston 58, lifts from the outer annular rib 61 and, via the annular gap which is becoming free, the vacuum chamber 36 now comes into communicating connection (via the vacuum passage 71, the annular gap which has become free and the atmospheric passage) with the actuation chamber 34 of the braking force amplifier 18 so that this actuation chamber 34 is relieved of pressure. Consequently, the force acting on the actuating piston 37 decreases and it now follows the pedal withdrawal movement until the driver holds the brake pedal 19 in a position corresponding to a desired, lower braking force. The vacuum passage 71 is therefore shut off again from the atmospheric passage 7S as soon as the outer annular rib 61 of the control part casing 39 again comes into contact with the annular disc 64.

For completeness, it should also be mentioned that the amplification range of the braking force amplifier 18, i.e. that range of variation of the control force $K_S$ within which the actuation force $K_B$ introduced via the pressure rod 27 to the primary piston 26 of the tandem main cylinder 27 satisfies the relationship $$K_B = A \cdot K_S,$$

is limited by a value $K_{Smax}$ which is given by the relationship $$K_{SmaxD} = \frac{F_{Ak} \cdot P_{max}}{A - 1}$$

in which the effective cross-sectional area of the actuating piston 37 of the braking force amplifier 18 is indicated by $F_{Ak}$, and the maximum value of the pressure difference between atmospheric pressure and the "vacuum" prevailing at the induction connection 38 of the vehicle engine is indicated by $P_{max}$. If the control force $K_S$ is increased beyond this value, the actuation force $K_B$ only continues to increase "linearly" with the magnitude of the increase of the control force $K_S$.

When required, i.e. when the driver actuates the brake pedal 19 with a speed $\dot{\phi}$ which is greater than a threshold value $\dot{\phi}_S$ which is specified or can be specified, the above-described braking force amplifier 18 is automatically switched over to an increased value $A_{max}$ of the amplification factor A. A switch over device for the automatic switch-over is provided which is only indicated diagrammatically in FIG. 1 but is represented in more detail in FIG. 2 and indicated generally by the numeral 92. The switch-over device operates on the principle of reducing the return force, which acts on the reaction piston 58 and, on actuation of the brake system 10, acts via the reaction element (the reaction disc 54) on the reaction piston 58 and likewise, thereby reducing the control force $K_S$, which is necessary to achieve action by pressure on the actuating piston 37 via the control part 41 acting as a proportional valve.

Figure 2:
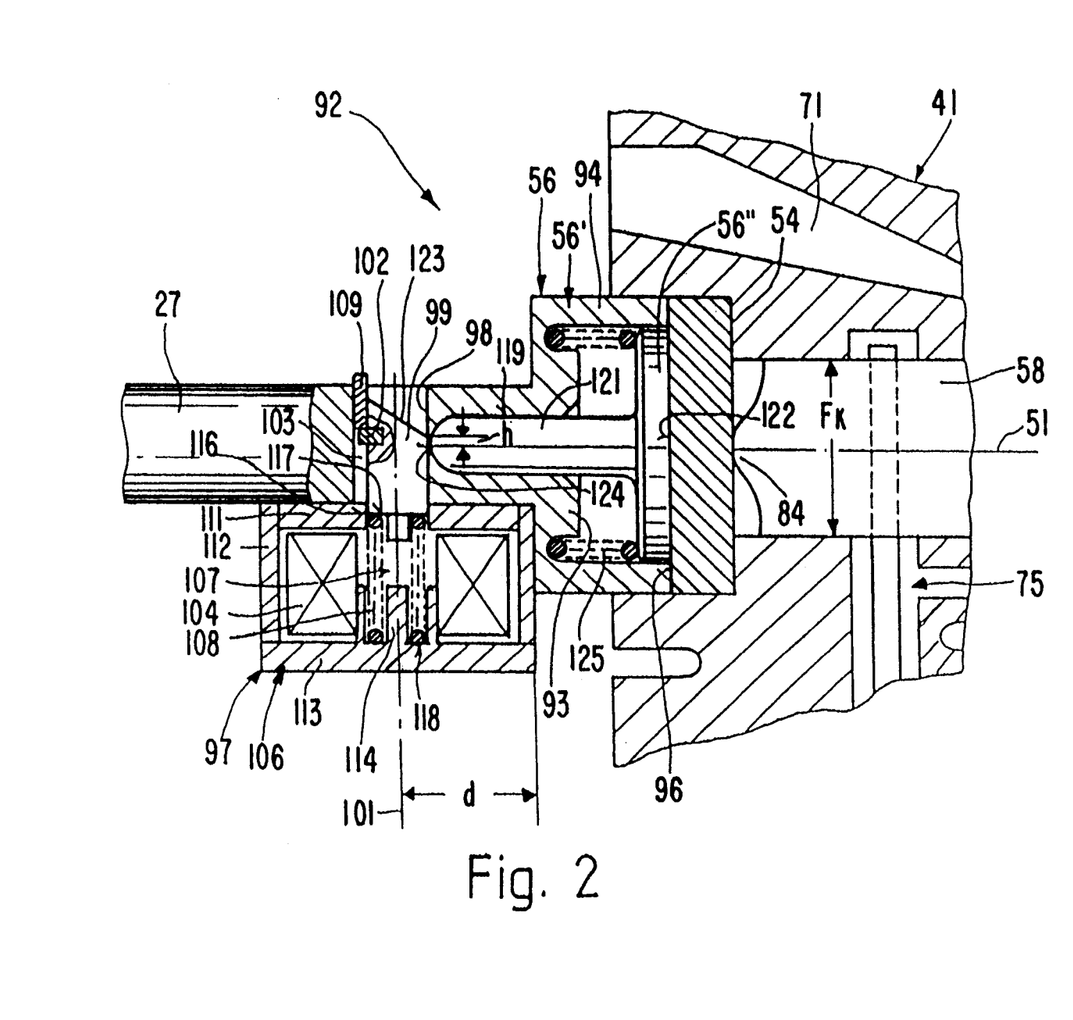
FIG. 2 is a cross-sectional view of a first embodiment of a switch-over device, which can be used as part of the brake pressure control device, with a two-part pressure rod flange, in which the pressure rod can be displaced by the braking force amplifier and acts on the main cylinder of the brake system shown in FIG. 1, and with a control magnet as the actuation device.

In the embodiment of FIG. 2, this switch-over device 92 is comprised of the following components. The flange 56 of the pressure rod 27 transmitting the reaction force $K_R$ to the reaction disc 54 has a cylindrical cup-shaped flange element 56' which is permanently connected (or integral with) to the pressure rod 27. The pressure rod 27 starts from the bottom 93 of the cylindrical cup-shaped flange element 56', the outer shell 94 of which points towards the reaction disc 54 and is axially supported by its narrow annular end surface 96 on the radially outer region of the reaction disc 54. Apart from a slight clearance necessary so that the pressure rod 27 can be displaced relative to the reaction disc 54, the outer diameter of the outer shell 94 of the cup-shaped flange part 56' corresponds to the inner diameter of the flat cup-shaped depression 53 of the control part casing 39 which accommodates the reaction disc 54.

At an axial distance D, essentially determined by the diameter of a control magnet 97 configured as an electromagnet, from the outer bottom surface of the cup-shaped flange part 56', the pressure rod 27 is provided with a radial transverse hole 98 in which is guided a bolt-shaped distance piece, which forms the movable armature 99 of the control magnet 97. The distance piece is guided so that it cannot be rotated but can be reciprocated in the direction of the central longitudinal axis 101 of the transverse hole 98. The armature 99 is secured against rotation by a short, radial guide pin 102 which protrudes into an axial guide groove of the transverse hole 98.

The control winding 104 of the control magnet 97, which is axisymmetrically configured relative to the central axis 101 of the radial transverse hole of the pressure rod 27, and its casing which consists of magnetizable soft iron and is indicated generally by the numeral 106, bound a central passage 107 into which the armature 99 is drawn when current is supplied to the control winding 104. When no current is supplied to the control magnet 97, the armature 99 is forced by a return spring 108 into the basic position represented in FIG. 2. The basic position is marked by contact of the guide pin 102 on a short stop key 109 which is permanently inserted in the guide groove 103 of the pressure rod 27 on the side of the pressure rod 27 opposite to the control magnet 97.

The casing 106 of the control magnet 97, which is fastened to the cup-shaped flange part 56' of the pressure rod 27 in a manner not show in any more detail, includes an annular disc 111 directly in contact with the pressure rod 27, a cylindrical outer shell 112 surrounding the control winding 104 on the outside and directly in contact with the annular disc 111 and a closing plate 113 closing the casing 106 on its radially outer side and directly in contact with the outer shell 112. The closing plate 113 is provided with a peg-shaped pole core piece 114 which protrudes into the central passage 107 and extends over approximately half the axial extent of the control winding 104. The annular disc 111 is provided with a central through-hole 116 aligned with the transverse hole 98 of the pressure rod 27. The inner end section of the armature 99, viewed in its basic position represented in FIG. 2, protrudes a short way into the through-hole 116, and the return spring 108 acts on the end surface 117 of the armature 99. On the casing side, the return spring 108 is supported at the bottom of an annular groove 118 of the pole core piece 114 and the axial depth of the annular groove 118 is somewhat larger than the solid length of the return spring 108 and corresponds approximately to the axial extent of the pole core piece 114.

A central, axial hole 119 extends between the radial transverse hole 98 of the pressure rod 27 and the internal space of its cup-shaped flange part 56'. A circular disc-shaped flange part 56" of the support flange 56 of the pressure rod 27 is guided so that it can be reciprocated in this axial hole 119 by a push-rod 121 acting as a distance piece. When the armature 99 of the control magnet 97 is located in the furthest possible engaged basic position in the transverse hole 98 of the pressure rod 27, as shown, the flange part 56" is held in direct contact with the reaction disc 54 by its axial support on the inner, spherical end of the push-rod 121 and thereby is supported on its total central circular area 122 located within the annular end surface 96 of the outer shell 94 of the cup-shaped flange part 56'. The circular disc-shaped flange part 56" is forced into contact with the reaction disc 54 by a return spring 125 which coaxially surrounds the push-rod 121, is arranged within the cup-shaped flange part 56' and is supported on the bottom 93 of the flange part 56'.

The armature 99 has a flat free end surface 123, which extends obliquely to the central longitudinal axis 101 of the transverse hole and whose profile in the plane of the drawing extends so that it falls or descends towards the push-rod 121 of the circular disc-shaped flange part 56" and meets the wall of the hole 98 at a small radial distance H which corresponds to a small fraction, for example 1/5 of the maximum stroke of the armature 99, from the intersection point 124 at which, viewed in the basic position of the armature 99, the push-rod 121 of the circular disc-shaped flange part 56" is axially supported on the armature 99. The inclination of this free end surface 123 of the armature 99 relative to the central axis 51 of the control part 41 is approximately 45°.

The switch-over device 92 of FIG. 2 operates as follows. When in the condition of the control winding 104 of the control magnet 97 when current is not supplied, the armature 99 of the control magnet 97 is engaged in the radial hole 98 of the pressure rod 27, the armature 99 acts as a distance piece by way of which the circular disc-shaped flange part 56" of the flange 56 of the pressure rod 27 is axially supported on the pressure rod 27 and is held in a large-area contact with the reaction disc 54. During an actuation of the brake system, therefore, the reaction piston 58 has to be displaced against a return force $K_R$ which is relatively large because the reaction disc 54 has large-area support on the circular disc-shaped flange part 56" and the annular end surface 96 of the shell shaped flange part 94, and therefore exhibits a correspondingly rigid reaction behavior. This provides a value of between 3 and 4 for the amplification factor of the braking force amplifier 18 as soon as the protruding humps 84 of the reaction piston 58 are fully immersed, i.e., have penetrated sufficiently far, during an actuation of the brake system 10, and the total cross-sectional area $F_K$ of the reaction piston 58 is supported on the reaction disc 54. This is already the case after a small fraction of the actuation stroke of the reaction piston 58.

An output signal is generated by the electronic control unit 126 to trigger the control magnet 97 when the electronic control unit 126 of the switch-over device 92 conducts an analysis of an output signal of a position sensor or a displacement sensor 127 characteristic of the position of the brake pedal 19 or of a part of the braking force amplifier 18 whose movement is directly connected to that of the brake pedal 19, for example the reaction piston 58 itself, and the analysis shows that the driver is actuating the brake pedal 19 with a speed $\dot{\phi}$ which is greater than a threshold value $\dot{\phi}_S$ which can be set or specified. Such speed occurs, for example, in the initial phase of a braking operation while the hump 84 of the reaction piston 58 must first penetrate into the reaction disc 54 before the total cross-sectional area $F_k$ becomes decisive for the speed $\dot{\phi}$ and is experienced by the driver as a reaction force. The armature 99 is then radially disengaged from its supporting position holding the circular disc-shaped flange part 56" in 15 contact with the reaction disc 54 and the flange part 56" can now be axially displaced. As a result, the opposing that the opposing force against which the reaction piston 58 must be displaced in order to select a braking force which is as high as possible is drastically reduced because the reaction disc 54 can now be relatively easily pressed into the cup-shaped flange part 56'. Because of this, the control force $K_S$, which is responsible for the opening of the seat valve formed by the annular disc 64 and the end surface of the axial rib 69 of the radial end flange 68 of the reaction piston 58 and providing the communicating connect ion between the actuation chamber 34 and the internal space 74 of the control part 41, is substantially reduced. Consequently, the amplification factor of the braking force amplifier 13 is correspondingly increased. The driver can thereby achieve full braking with a relatively low control force $K_S$, as is "presumed" or defaulted by the electronic control unit 126 as being desired and as is made possible by the disengagement actuation of the armature 99 of the control magnet 97.

In a particularly expedient configuration of the control unit 126 and of the control magnet 97 provided for actuating the switch-over device 92, the supply of current to the control magnet 97 is maintained as long as the output signal of the sensor 127 indicates, after a disengagement of the armature 99 of the control magnet 97 from the support position, that the driver continues to actuate the brake pedal 19 in the sense of a buildup of brake pressure. The electronic control unit 126 recognizes this continued actuation because the direction of change of the output signals of the sensor 127, which are characteristic of position, is the same as in the case of the actuation of the brake system 10 initiating the braking operation and/or because the pedal position has not changed. The electronic control unit 126 assesses this is an indication that the vehicle deceleration achieved by the actuation of the brake system 10 corresponds to the driver's wishes. The supply of current to the control winding 104 of the control magnet 97 is cancelled when the driver withdraws the brake pedal 19. The electronic control unit 126 can recognize this withdrawal because the direction of change of the output signals of the sensor 127, which are characteristic of position, has reversed. If, in this case, the reaction force from the return springs 125 and 108, which respectively act on the circular disc-shaped flange element 56" and the armature 99 of the control magnet 97, is sufficient, when acting in total on the reaction piston 58 via the reaction disc 54, to push the reaction piston 58 back against the control force $K_S$ acting thereon, the armature 99 of the control magnet 97 of the switch-over device 92 can fall back into its engaged position in the radial hole 98 of the pressure rod 27 and the braking force amplifier again operates with the relatively low amplification factor of around 4 associated with judicious braking operation. This amplification factor of around 4 subsequently remains effective, i.e. for the case where the driver wishes to further increase the vehicle deceleration, and is desirable because the relatively lower amplification factor permits better metering of the braking force in the further course of the braking procedure.

As long as the armature 99 of the control magnet 97 disengaged from its basic position, in which it acts as a distance piece, the feedback experienced by the driver with respect to the actuation condition of the brake system 10 is essentially determined by the return force of the return spring 125, which forces the circular disc-shaped flange part 56" into contact with the reaction disc 54 and is connected mechanically in parallel with the armature 99. That is, it only becomes effective as the return element when the armature 99 of the control magnet 97 has been disengaged from the position in contact with the push-rod 121. When this is the situation, the braking force amplifier 18 operates with the increased amplification factor $A_{max}$, which can be specified by the sizing of the return spring 125 and the effective cross-sectional area of the circular disc-shaped flange element 56".

In order to facilitate the disengagement of the armature 99 while interacting with the control force $K_S$ exerted by the driver, it can also be expedient for the end of the push-rod 121 of the circular disc-shaped flange part 56", which can be supported on the armature 99, to have a flat conical profile following on from a spherical end section with a relatively large radius of curvature, with its cone angle corresponding relative to the central axis 51 of the control part 41, to twice the value of the angle of inclination, of the oblique end surface 123 of the armature 99.

Figure 3:
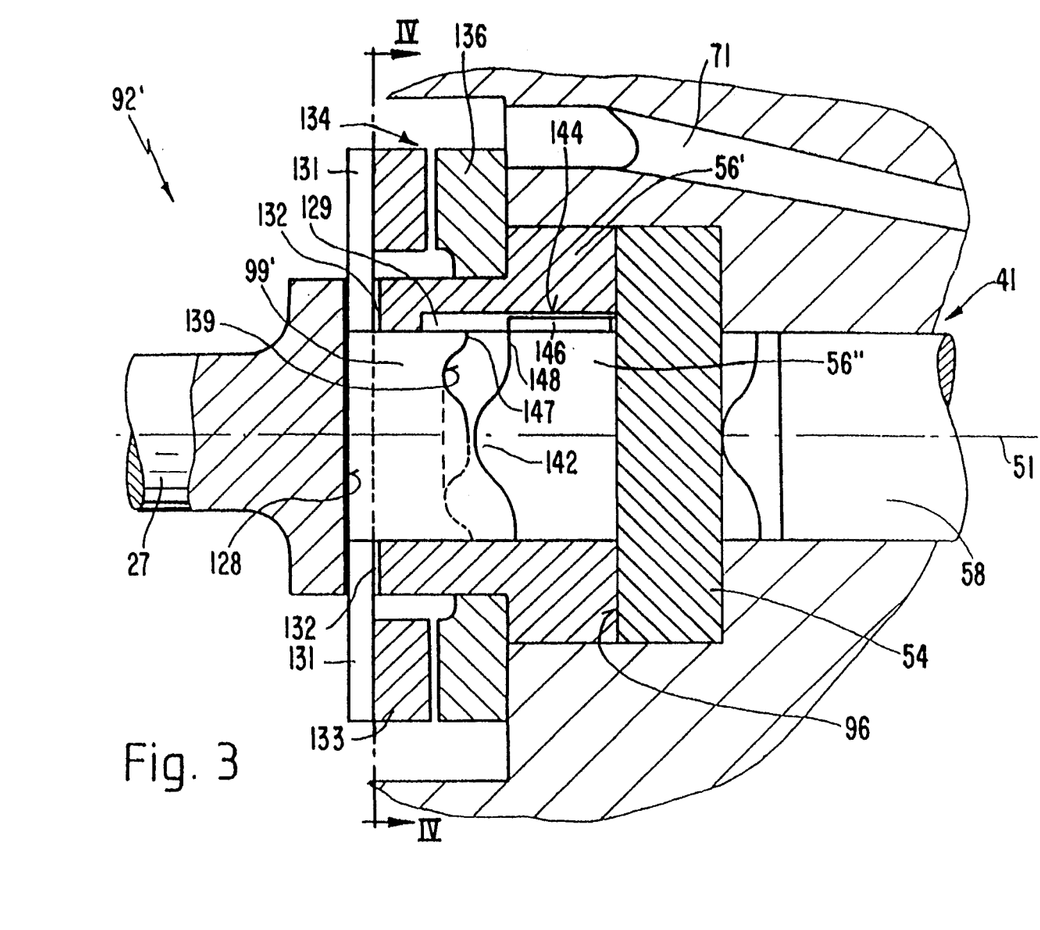
FIG. 3 is a cross-sectional view of a further embodiment of a switch-over device with a rotatable distance piece which can be used in the brake pressure control device of FIG. 1.

A further embodiment of a switch-over device 92, which can be used as part of the brake pressure control device according to the invention, is designated generally by the numeral in FIG. 3, to whose details reference is now made. This embodiment is substantially analogous in construction and function to that of FIG. 2. To the extent, therefore, that functional elements of the switch-over device 92' of FIG. 3 are provided with the same reference symbols as functional elements of the switch-over device 92 of FIG. 2, this is intended to show structural and functional equivalence and/or analogy between these elements and where elements identically indicated in this way are not themselves explained as part of the description of FIG. 3, they contain the reference to the description of these elements given in FIG. 2, in order to avoid unnecessary repetition for one of ordinary skill in the art.

In the switch-over device 92', a circular cylindrical block-shaped part, comparable in function with the armature 99 of the control magnet 97 of the switch-over device 92 is provided as the distance piece 99'. The circular cylindrical block-shaped part is arranged so that it can be rotated within the cup-shaped flange part 56' around the central axis 51 of the control unit 41 of the braking force amplifier 18. The block-shaped distance piece 99' is axially supported on the bottom 128 of the central depression 129 of the cup-shaped flange part 56'.

The distance piece 99' is torsionally connected to the annular disc-shaped rotor 133 of a schematically illustrates electrical stepper motor and arranged outside the cup-shaped flange piece 56', by means of radial spoke pieces 131, which emerge through radial slots 132 from the internal space 129 of the cup-shaped flange part 56'. The stator 136 of the stepper motor 134 is torsionally connected to the cup-shaped flange part 56' of the pressure rod 27 of the braking force amplifier 18. Viewed along the central longitudinal axis 51, the azimuthal extent $\Gamma$ of the radial slots 132 and the azimuthal extent $\delta$ of the spoke pieces 131 are dimensioned such that as appears in detail from the representation of FIG. 4, the angle $\Gamma - \gamma$ by which the distance piece 99' can be rotated between its end positions when the stepper motor 134 has current applied thereto is 60°. These end positions are marked by the stop effect between the spoke pieces 131 and the radial edges 136, 137 of the radial slots 132. The azimuthal extent F of the radial slots 132 is 90° and that of the spoke pieces 131, when the same are embodied in sector vane shape, is 30°. The rotor 133 of the stepper motor 134 and, with the latter, the block-shaped distance piece 99' are forced, in the condition of the stepper motor 134 where no current is supplied, by a torsional spring (not shown) into the basic position represented in FIG. 4, in which one radial edge of the sector vane-shaped spoke pieces 131 is held in contact with those radial edges 136 of the radial slots 132 which extend in the radial plane 137 which forms the drawing plane of FIG. 3 and represents the stop plane for the basic position of the rotor 133 of the stepper motor 134 in FIG. 4. On its side facing towards the circular disc-shaped flange part 56", the block-shaped distance piece 99 ' is provided with a radial groove 139 whose radially central plane 141 encloses, in the illustrated embodiment an angle of 30° with the radial plane 137 marking the basic position of the distance piece 99'. On its side facing towards the distance piece 99', the circular disc-shaped flange part 56" has a radial rib 142 of a shape complementary to the groove 139 of the distance piece. The radially central plane 143 of the rib 142 extends at right angles for the stop plane 137 marking the basic position of the distance piece 99'. The circular disc-shaped flange part 56" has a key which is in engagement with an axial internal groove 144 of the cup-shaped flange part 56' and the circular disc-shaped flange part 56" is secured thereby against rotation about the central longitudinal axis 51 and is otherwise guided so that it can be displaced axially in the cup-shaped flange part 56'.

The switch-over device 92' operates analogously to the switch-over device 92 of FIG. 2 in the following manner. When no current is supplied to the stepper motor 134, the distance piece 99' is forced into its basic position in which its groove 139 extends obliquely to the rib 142 of the circular disc-shaped flange part 56' whose radial rib 142, crossing over the groove 139 of the distance piece 99', is axially supported on the otherwise flat end surface 147 of the distance piece 99' and is held thereby in rearward contact with the reaction disc 54, i.e. in that position in which the amplification factor A of approximately 4 of the braking force amplifier 18, which can be used for judicious braking, can be employed.

Figure 4:
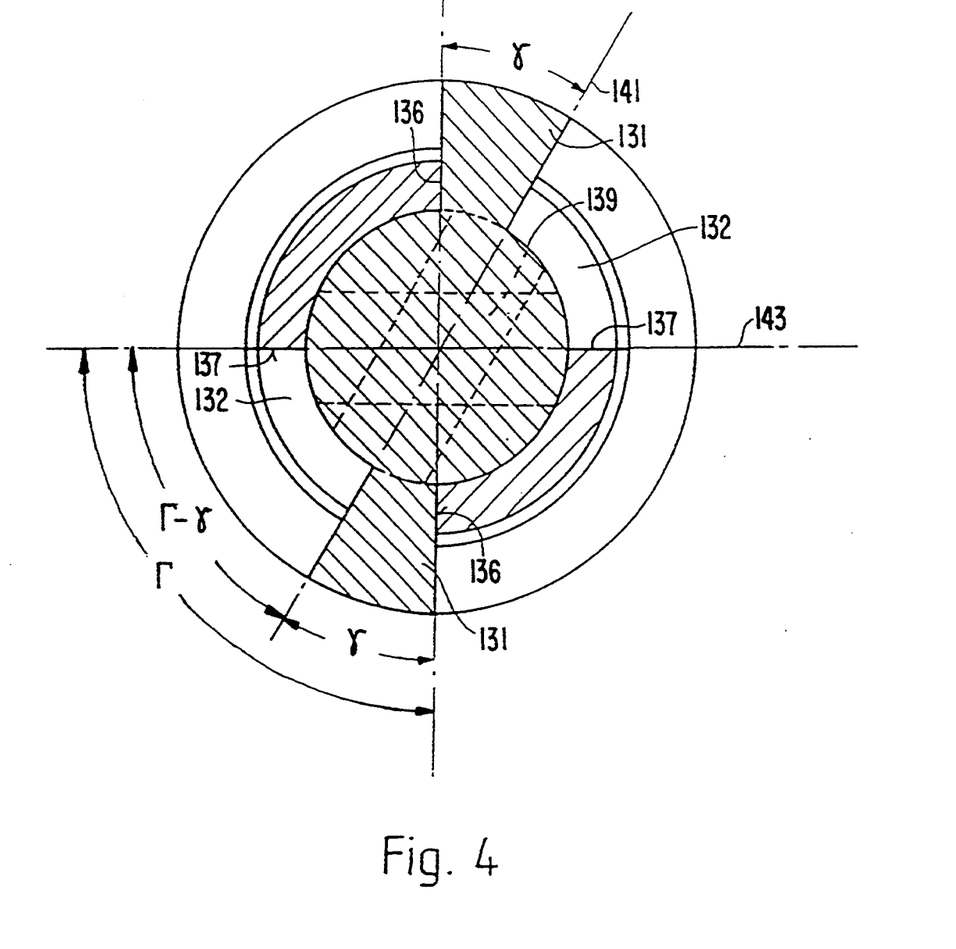
FIG. 4 is a sectional view along the line IV—IV of FIG. 3.

If the driver actuates the brake pedal 19 with an excessive actuation speed $\dot{\phi}_S$ when introducing a braking operation, the electronic control unit 126 generates output signals to supply current to the stepper motor 134 so that the distance piece 99' is rotated, in the clockwise direction as shown in FIG. 4, as fair as that position in which the radial rib 142 of the circular disc-shaped flange part 56" can enter the groove 139 of the distance piece 99'. This has the result that the central region of the reaction disc can deflect more easily, and a smaller control force is therefore necessary to achieve a high braking force amplification. The sides of the groove 139 of the distance piece 99' and the flanks of the rib 142 of the circular disc-shaped flange part 56" have an inclination of 45° relative to the central longitudinal axis 51 of the control part 41 and they respectively join with smooth curvature onto the adjacent flat end surfaces 147 of the distance piece 99' and the flat, radially outer region 148 of the end surface of the circular disc-shaped flange part 56". When the distance piece 99' is rotated back into its basic position due to the action of the torsional spring, therefore, the circular disc-shaped flange part 56" can be pushed back relatively easily until it comes into contact with the reaction disc 54.

Figure 5:
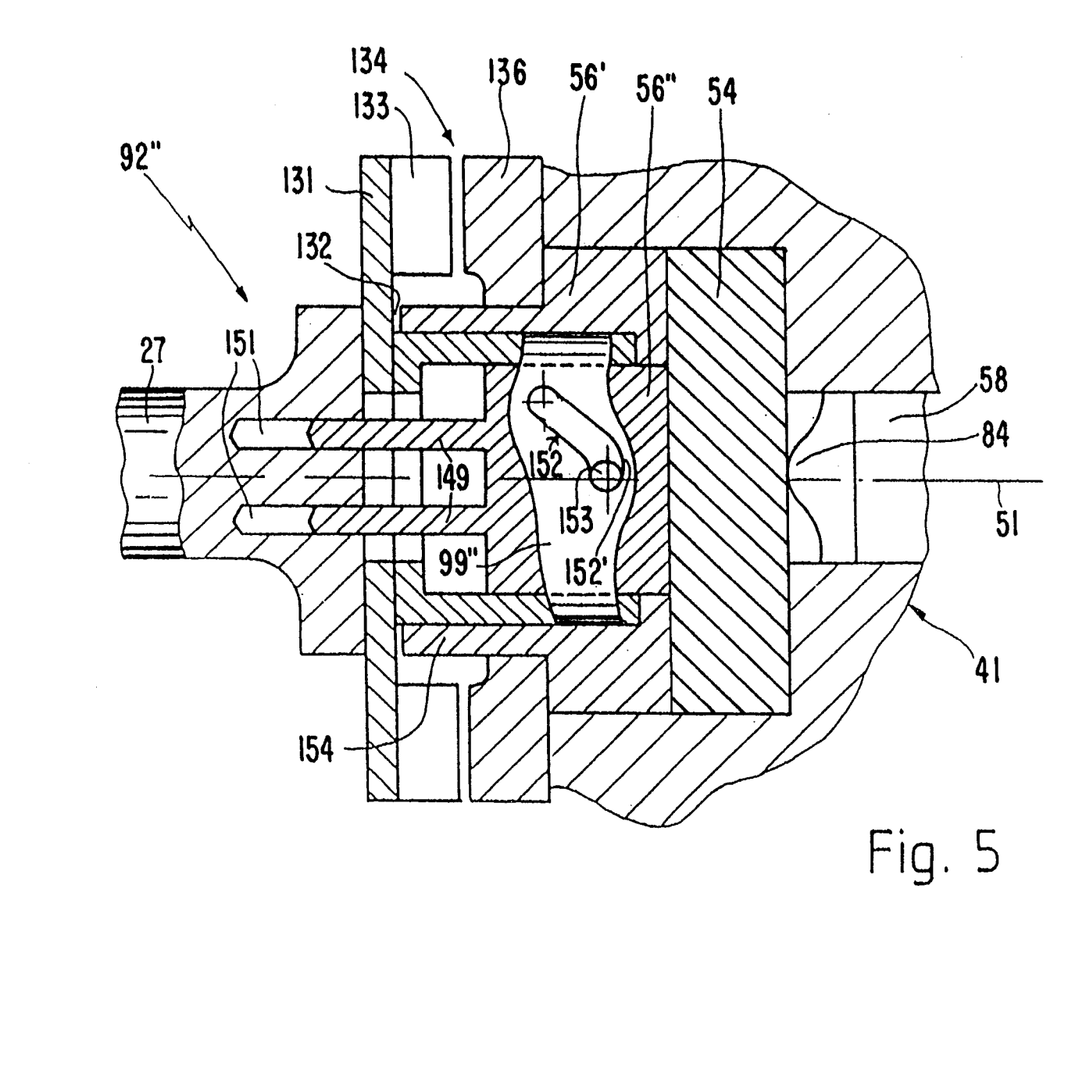
FIG. 5 is a cross-sectional view of yet another embodiment of a switch-over device of the brake pressure control device, and is functionally equivalent to the switch-over device of FIG. 3.

A still further embodiment of a switch-over device 92", which can be used as part of the brake pressure control device and which is shown in FIG. 5, to whose details reference is now made, is substantially analogous in construction and function to the embodiment of FIG. 3. To the extent, therefore, that functional elements of the switch-over device 92" of FIG. 5 are provided with the same reference symbols as functional elements of the switch-over device 92" of FIG. 3, this is intended to signify structural and functional equivalence and/or analogy between these elements, and where elements identically indicated in this way are not themselves mentioned as part of the description of FIG. 5, they again signify the reference to the description of these elements given in FIG. 3.

The switch-over device 92" of FIG. 5 differs from the switch-over device 92' of FIG. 3 only with respect to the following constructional details. The distance piece 99''', which can be rotatably driven by the stepper motor 134, is configured as an annular cylindrical sleeve in which the circular disc-shaped flange part 56" is supported so that it can be displaced axially.

The circular disc-shaped flange part 56" is secured against rotation relative to the pressure rod 27 by two slender pegs 149 which are arranged at a small lateral distance from the central longitudinal axis 51 of the control part 41, extend parallel to the latter and are guided so that they can be displaced parallel to the axis 51 in associated holes 151 of the pressure rod 27. The annular cylindrical sleeve-shaped distance piece 99" has a slot-shaped linkage opening which is indicated generally by numeral 152 and which is an engagement with a radial drive trunnion 153 which is permanently connected to the circular disc-shaped flange part 56". The clear width respectively measured at right angles to its edges of the linkage opening 152 corresponds, apart from a small guidance clearance, to the diameter of the drive trunnion 153.

The essentially elongated linkage opening 152 extends, viewed in the layout development of the outer shell 154 of the sleeve-shaped distance piece 99", at 45° to the direction of the central longitudinal axis 51 over the major part of its length, and on its short end section 152' facing towards the reaction disc 54, whose length approximately corresponds to the diameter of the drive trunnion 153, the opening 152 extends at right angles to the direction of the central longitudinal axis 51 of the control part 41. In the basic position of the distance piece 99" associated with judicious braking operation and represented in FIG. 5, the drive trunnion 153 is arranged in the short end section 152' extending at right angles to the direction of the central longitudinal axis 51 and thereby the circular disc-shaped flange part 56" is held in contact with the reaction disc 54.

The circular disc-shaped flange part 56" experiences an axial displacement by rotation of the sleeve-shaped distance piece 99" out of the basic position, which rotation can be controlled by the stepper motor 134. Because of this, the flange part 56" lifts from the reaction disc 54 so that the return force of the latter relative to a feed movement of the reaction piston 58 is reduced and, consequently, the amplification factor of the braking force amplifier 18 is increased. In the condition of the stepper motor 134 where no current is supplied, the distance piece 99" is in turn rotated back by a torsional spring (not shown) or an equivalent return element. The function of the switch-over device 92" of FIG. 5 is completely analogous to that of FIG. 3. t is evident that the sleeve-shaped distance piece 99" can also be provided in axially symmetrical arrangement with two linkage openings 152 and, correspondingly, the circular disc-shaped flange part 56" can be provided with two drive trunnions 153.

Figure 6:
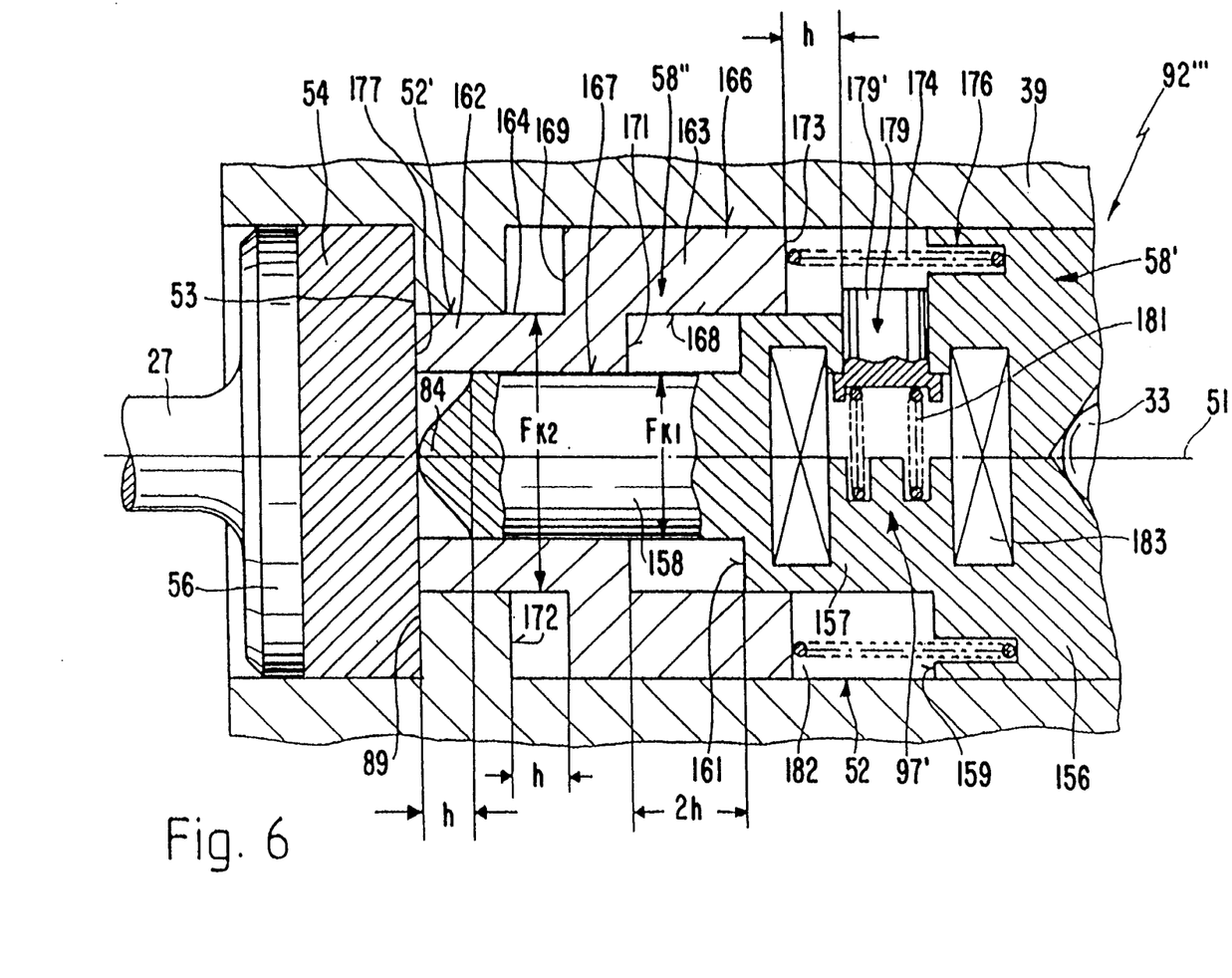
FIG. 6 is a partial cross-sectional view of still a further embodiment of the switch-over device, which can be used as part of the brake pressure control device shown in FIG. 1, for the amplification factor of the braking force amplifier, with a reaction piston configured in two parts and distance piece arranged between the reaction piston elements.

The further variant of a switch-over device 92''' which can be used as part of the brake pressure control device and which is represented in FIG. 6, to whose details reference is now made, is similar to that of FIG. 2 to the extent that a control magnet 97' is also provided for actuation. Current is supplied to the control magnet 97' when the driver actuates the brake pedal very rapidly and, consequently, the switch-over of the braking force amplifier 18 to an increased amplification factor $A_{max}$ is initiated.

To the extent that the same reference symbols are used for functional elements of the switch-over device 92" of FIG. 6 as are used in FIGS. 1 to 5, this is to signify structural and functional identity and/or analogy of these elements and, to the extent that elements indicated identically in this way by FIG. 6 are not themselves explained, they contain the reference to the description of these elements given by means of the other drawing figures.

In the case of the switch-over device 92''' of FIG. 6, a reaction piston arrangement including two piston elements 58', 58'' is provided for which different values $F_{K1}$ and $F_{K2}$ of the effective cross-sectional area with which the reaction piston arrangement 58', 58'' acts on the reaction discs 54 can be utilized, so that correspondingly different values of the amplification factor, with which the braking force amplifier 18 operates, are provided.

One reaction piston element 58', on which the pedal push-rod 33 acts, has three piston steps 156, 157 and 158, of different defined diameter, which are stepped down relative to one another by respective radial annular end surfaces 159 and 161. The piston step 156, on which the pedal push-rod 33 acts directly, has the largest diameter and the third piston step 158, which is connected to the first piston step by the second piston step 157 and by way of which the reaction piston element 58' is directly supported axially on the reaction disc 54, has the smallest diameter.

The second piston element 58'' is configured as a two-step annular piston with two cylindrical tubular steps 162, 163 whose outer shell surfaces 164, 166 and inner shell surfaces 167, 168 are connected to one another by an outer radial annular end surface 169 and an inner radial annular end surface 171. The annular piston 58'' is guided so that it can slide and be displaced by the inner shell surface 167 of its smaller-diameter piston step 162 on the smallest-diameter piston step 58 of the three-step piston element 58' and in the hole 52' opening centrally into the flat cup-shaped depression 53, which accommodates the reaction disc 54, by its outer shell surface 164. The hole 52' is connected by a radial step surface 172 to the larger diameter hole 52 in which the annular piston 58'' is guided so that it can slide and be displaced by the outer shell surface 166 of its larger-diameter annular piston step 163 and the three-step reaction piston element 58' is guided so that it can slide and be displaced in the hole 52 by its largest piston step 156. The larger-diameter annular piston step 163 is also supported so that it can slide and be displaced on the central piston step 157 of the three-step reaction piston element 58' by its inner shell surface 168.

A relatively weakly prestressed return spring 174 acts on the radial end surface 173 of the two-step annular piston 58'' facing towards the largest piston step 156 of the three-step piston element 58'. The return spring 174 is axially supported on the bottom of a radially outer annular groove 176 of the largest piston step 156 of the three-step reaction piston element 58'. The free annular end surface 177 facing towards the reaction disc 54 of the two-step annular piston is forced into contact with the reaction disc 54 by this return spring 174, and the smallest piston step 158 of the three-step reaction piston element 58' acts on the reaction disc 54 by the projecting hump 84.

The medium-diameter piston step 157 of the three-step reaction piston element 58' is provided with a radial hole 178 in which a piston-shaped distance piece 179 is guided so that it can be displaced radially. This distance piece 179 is forced by a return spring 131 into a radially outer position, marked by the effect of a stop, in which its free end section 179' protrudes into the annular gap 182 remaining between the radial end surface 173 of the larger step 163 of the annular piston 58'' and the radially annular end surface 159 of the largest piston step 156 of the three-step reaction piston element 58' opposite to the end surface 173. This piston-shaped distance piece 179 is configured as the armature of the control magnet 97' and is completely immersed inside the central piston step 157 when current is supplied to the field winding 183.

The positions of the piston elements 58', 58'' and of the armature 179 of the control magnet 97' represented in FIG. 6 correspond to the non-actuated condition of the brake system. In this condition, the clear axial distance H of the disengaged piston-shaped armature 179 from the end surface 173 facing there towards corresponds, in effect, approximately to the of height of the hump 84 of the smallest-diameter piston step 158 of the three-step piston element 58'. Similarly, the clear axial distance between the radial end surface 172, by way of which the hole steps 52', 52 of the control part casing 39 are connected to one another, and the outer radial annular end surface of the stepped annular piston 58'' opposite to the radial end surface 172 is also approximately equal to the height of the hump 84. The clear axial distance between the inner radial annular end surface of the two-step annular piston 58'' and the radial annular end surface 161 of the three-step piston element 58'', which provides the step-down of the smallest piston step relative to the central piston step, has approximately double the value, the same approximately as the axial thickness of the reaction disc 54. The switch-over device 92''', as explained above, operates in the following manner. If, during the initiation of a braking operation, the brake pedal is actuated slowly with the result that the field winding 183 of the control magnet 97' is not supplied with current and the armature 179 remains disengaged in the radial direction, the armature 179 comes into contact with the end surface 173 of the annular piston 58'' facing towards the armature 179 due to the displacement of the three-step piston element 58' relative to the annular piston 58'' after the total height H of the hump is immersed against the moderate return force developed by the reaction disc 54 so that the annular piston 58'' is now forced together with the three-step piston element 58' further towards the reaction disc 54 or into the latter. The magnitude $F_{K2}$ of the effective cross-sectional area of the reaction piston arrangement 58', 58'', which is decisive with respect to the amplification factor of the braking force amplifier 18, is here equal to the sum of the cross-sectional areas of the smallest piston step 158 of the three-step piston element 58' and the free end surface 177 of the smaller cylindrical tubular step 162 of the annular piston 58''. Because of this relatively large effective cross-sectional area with which the reaction piston arrangement 58', 58'' is supported on the reaction disc 54, the braking force amplifier 18 operates with the relatively low amplification factor A, which is necessary for a judicious braking operation but which permits sensitive metering of the vehicle deceleration.

If the driver actuates the brake pedal with a speed which is greater than the aforementioned threshold value $\dot{\phi}S$ the field winding 183 of the control magnet 97' is excited by an output signal of the electronic control unit 126, and the armature 179 is drawn into the central piston step 157. The three-step piston element 58' can now be displaced further within the larger step 163 of the two-step annular piston 58" without the two-step annular piston 58" moving further so that only the cross-sectional area $F_{K1}$ of the smallest piston step 158 is utilized as the effective reaction area. The result is that the amplification factor of the braking force amplifier is markedly increased and a high braking deceleration of the vehicle can be selected with a smaller control force $K_S$.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A brake pressure control device for a road vehicle with a hydraulic multi-circuit brake system comprising a main cylinder for generating the brake pressures to be coupled into wheel brakes, a pedal-controlled pneumatic braking force amplifier operatively arranged to actuate the main cylinder, and operatively associated with the braking force amplifier for a switch-over device responding to actuation behavior of a road vehicle driver and configured to cause the braking force amplifier to be automatically switched over from a value of an amplification factor meeting a judicious braking requirement to a higher value of the amplification factor meeting a full braking requirement at least where a speed with which a driver actuates a brake pedal in an introductory phase of a braking action exceeds a threshold value, the braking force amplifier having a vacuum chamber connected to an induction connection of the road vehicle and, opposite the vacuum chamber, an actuation chamber movably bounded by an actuating piston and configured to be acted on by a pressure higher than a pressure prevailing in the vacuum chamber in proportion to a control force exerted on the brake pedal via a control part configured to act as a proportional valve and actuable by the brake pedal, the control part having a valve casing permanently connected to the actuating piston and axially displaceable therewith and a reaction piston forming a valve body and axially displaceable in the valve casing so as to be displaceable relative to the valve casing by actuation of the brake pedal in the direction of a force path marked by the control force and a resulting reaction force on actuation of the main cylinder, the reaction piston being supported by a reaction element, configured to be flexible at least in an axial direction, on a pressure rod for transmitting to the main cylinder an actuation force developed by action of pressure on the actuating piston, which reaction element exerts a reaction force directed in a direction opposite to the control force on the reaction piston and corresponding to a defined fraction of the actuation force acting on the main cylinder given by the reciprocal of the amplification factor of the braking force amplifier effective during the judicious braking operation, wherein in an axial force transmission train, leading from the brake pedal via the reaction piston of the control part, via the reaction element and via the actuating piston of the braking force amplifier to the main cylinder, for the control and actuation forces and for the reaction force resulting from the actuation of the main cylinder, which provides the driver with feedback on the functional condition of the brake system, a rigid force transmission element is provided in mechanical parallel connection to a flexible transmission element, with which force transmission element is associated a position engaged in the force transmission train as a basic position for the judicious braking operation, in which basic position the rigid force transmission element constitutes a distance piece between two force transmission train elements following sequentially in the force path direction, and a switch-over device is provided for the distance piece so as to respond when the threshold value of the pedal actuation speed is exceeded and then disengages the distance piece from a supporting position thereof and thereby frees a displacement path within which the reaction piston of the control part can be displaced against a reduced return force in the sense of a pressure buildup control of the control part.

2. The brake pressure control device according to claim 1, wherein a disc is centrally arranged on the actuating piston of the braking force amplifier and is configured to be elastically flexible to serve as the reaction element on one side of which the pressure rod is axially supported and on the opposite side of which the reaction piston is supported, the reaction piston having a convex curvature on its support end facing towards the reaction disc, which convex curvature acts with an increasing amount of its surface on the disc, axially supporting thereon, in the event of a displacement, controlled by pedal force, of the reaction piston, and the amount of annular area of the disc coaxially surrounding the support surface and on which the pressure rod is supported by a radial support flange being greater by approximately the amplification factor of the braking force amplifier associated with the judicious braking operation, than the maximum cross-sectional area with which the reaction piston is supported on the opposite side of the disc, wherein at least one of the reaction piston and the pressure rod is configured as a plurality of parts and each has a first piston element and a first flange element, via which a minimum area with which the reaction piston and the pressure rod can be supported on the reaction disc is determined, together with a second piston element and a second flange element which, in the basic position of the reaction piston and the pressure rod associated with the judicious braking operation, is rigidly connected for movement to the first piston element and the first flange element and, together with the first piston element and the first flange element, is held in the position acting on the reaction disc and, in the functional position of the switch-over device associated with full braking operation, can be moved either freely or against a small resistance at least within a limited axial displacement range.

3. The brake pressure control device according to claim 2, wherein the flange axially supports the pressure rod on the reaction disc and is configured in two parts with an outer, annular flange element permanently supported on an outer annular area region of the reaction disc and a central circular disc-shaped flange element rigidly supported on the pressure rod in a functional position of the switch-over device associated with the judicious braking operation of the brake system and held in large-area contact with the reaction disc, wherein, in the functional position of the switch-over device associated with full braking operation of the brake system, the disc-shaped flange element is held so as to be axially moveable relative to the pressure rod and can be displaced against a small return force.

4. The brake pressure control device according to claim 3, wherein the central circular disc-shaped flange element has an axial push-rod which, protruding into a central longitudinal hole of the pressure rod, is operatively guided so as to be slidable and displaceable in the central longitudinal hole and can be supported on a distance piece constituting the rigid force transmission element and guided so as to be displaceable in a transverse hole radially relative to the central longitudinal axis of the control part, the circular disc-shaped flange element being held in large-area contact with the reaction disc in a support position specified by support on the distance piece, and the distance piece can be disengaged from the support position by actuation of the switch-over device configured to be electrically triggerable.

5. The brake pressure control device according to claim 4, wherein the distance piece is configured as an armature of a control magnet with a control winding fixed to a side of the pressure rod and in coaxial arrangement with a central axis of the transverse hole in the pressure rod.

6. The brake pressure control device according to claim 5, wherein the distance piece has a flat, free end surface extending obliquely to the central axis of the transverse hole and, with orientation of the free end surface extending so as to be inclined towards the central axis of the control part at the push-rod end, is displaceable in a rotationally fixed manner in the transverse hole.

7. The brake pressure control device according to claim 6, wherein the support position of the distance piece, the distance between the support point of the push-rod and the edge of the free end surface of the distance piece adjacent the push rod corresponds to between about 1/10 and ⅓ of the maximum deflection stroke of the distance piece, and the distance piece is supported by a return spring on the casing of the control magnet, with the sprung distance of the return spring being greater than a deflection stroke achievable by excitation solely of the control winding.

8. The brake pressure control device according to claim 6, wherein the free end of the push-rod has one of spherical configuration and a cone-like configuration with a cone angle corresponding to twice the value of the angle of inclination with which the free end surface of the distance piece extends inclined relative to the central axis of the control part.

9. The brake pressure control device according to claim 8, wherein the support position of the distance piece, the distance between the support point of the push-rod and the edge of the free end surface of the distance piece adjacent the push rod corresponds to between about 1/10 and ⅓ of the maximum deflection stroke of the distance piece, and the distance piece is supported by a return spring on the casing of the control magnet, with the sprung distance of the return spring being greater than a deflection stroke achievable by excitation solely of the control winding.

10. The brake pressure control device according to claim 3, wherein the outer annular flange element is constituted by one of a free end of the outer shell of a cup-shaped flange part permanently connected to the pressure rod, which free end faces the reaction disc, and by an annular flange projecting radially from the free end of the outer shell end, the distance piece being constituted by a circular cylindrical block-shaped part axially disengaged within the cup-shaped flange part relative to the latter but rotatably supported about the central longitudinal axis thereof, the circular disc-shaped flange element being displaceably guided in the axial direction within the cup-shaped flange part, the circular disc-shaped flange part and the distance piece are provided on their mutually facing ends with profiles of complementary shape whose profile depths correspond at least to that displacement path by which the reaction piston must be displaced relative to the casing of the control part to achieve maximum action by pressure on the actuation chamber of the braking force amplifier, and an electrical actuator, is operatively associated with the distance piece so as to rotate the distance piece is rotatable by triggering the electrical actuator, from a basic position with defined orientation different from the orientation of the profile of the circular disc-shaped flange part into a position in which the orientations of the two profiles are identical.

11. The brake pressure control device according to claim 10, wherein the profiles are formed by at least one radially extending groove and one radially extending rib.

12. The brake pressure control device according to claim 3, wherein the annular flange element is cup-shaped and has a support surface for axial support on the reaction disc formed by one of the free annular end surface of the cup outer shell and the annular area of a supporting flange projecting from the cup outer shell, and within the cup-shaped flange element, a tubular sleeve constituting the distance piece is rotatably supported and arranged to present axial disengagement, the tubular sleeve coaxially enclosing the central circular disc-shaped flange element, arranged to be axially displaceable, on a section of a length thereof which is greater than the axial displacement path of the circular disc-shaped flange element, and the tubular sleeve being provided with at least one elongated linkage opening which, over a major length portion thereof, viewed in a layout development of the sleeve shell, extends obliquely at about 45° to the longitudinal axis of the control part and, on a short end section facing towards the reaction disc, extends at right angles to the longitudinal axis of the control part, the circular disc-shaped flange element being provided with a radial trunnion configured to be in engagement with the linkage opening, and the circular disc-shaped flange element being secured against rotation within the sleeve-shaped distance piece by at least one eccentric guide pin protruding into a pocket hole in the pressure rod.

13. The brake pressure control device according to claim 10, wherein stepper motor is operatively arranged to actuate the rotatable distance piece, the stepper motor having a stator and a rotor arranged radially outside the pressure rod and the cup-shaped flange element, the rotor being torsionally connected to the rotatable distance piece by spoke pieces having only a small profile, viewed in a direction of the rotation, said spoke pieces emerging from radial slots in the shell part surrounding the rotatable distance piece, an azimuthal Width of said slots, measured in the direction of rotation, being greater by the angular amount by which the distance piece must be rotatable so that the circular disc-shaped flange element is displaceable in the axial direction by the necessary stroke relative to the annular flange-shaped piston element.

14. The brake pressure control device according to claim 13, wherein the profiles are formed by at least one radially extending groove and one radially extending rib.

15. The brake pressure control device according to claim 14, wherein the annular flange element is cup-shaped and has a support surface for axial support on the reaction disc formed by one of the free annular end surface of the cup outer shell and the annular area of a supporting flange projecting from the cup outer shell, and within the cup-shaped flange element, a tubular sleeve constituting the distance piece is rotatably supported and arranged to present axial disengagement, the tubular sleeve coaxially enclosing the central circular disc-shaped flange element, arranged to be axially displaceable, on a section of a length thereof which is greater than the axial displacement path of the circular disc-shaped flange element, and the tubular sleeve being provided with at least one elongated linkage opening which, over a major length portion thereof, viewed in a layout development of the sleeve shell, extends obliquely at about 45° to the longitudinal axis of the control part and, on a short end section facing towards the reaction disc, extends at right angles to the longitudinal axis of the control part, the circular disc-shaped flange element being provided with a radial trunnion configured to be in engagement with the linkage opening, and the circular disc-shaped flange element being secured against rotation within the sleeve-shaped distance piece by at least one eccentric guide pin protruding into a pocket hole in the pressure rod.

16. The brake pressure control device according to claim 13, wherein the reaction piston is a two-part reaction piston including a first reaction piston element acting centrally on the reaction disc and on which a pedal push-rod acts, and a second reaction piston element configured as an annular piston axially supported on the reaction disc by an end surface coaxially surrounding an eccentric surface region on which the first reaction piston element acts, the first reaction piston element and the second reaction piston element being arranged at an axial distance from one another and having opposite end surfaces which form axially movable boundaries of an annular gap having an radially outer region to accommodate a return spring axially supported on the two reaction piston elements and configured to provide a maximum return force which is smaller by a factor between about 2 and 6, than the maximum reaction force effective on the second reaction piston element during a braking action, the first reaction piston element has a radial hole in which a distance piece is guided as to be radially displaceable and automatically controlled by the control magnet of the switch-over device, between a radially outer end position in which the distance piece protrudes with a short end section into the radially inner region of the annular gap and a radially inner end position in which the distance piece is completely within the first reaction piston element, a clear distance of the distance piece from the annular end surface of the second reaction piston element, with which the distance piece is arranged to come into contact in a disengaged position in the case of a brake actuation, viewed in the basic position of the distance piece corresponding to the non-actuated condition of the brake system, corresponds to an initial stroke of the first reaction piston element which can be carried out against a small reaction force relative to the second reaction piston element, and the range of displacement paths of the first reaction piston element freed in the engaged position of the distance piece is dimensioned to be at least approximately sufficiently large relative to the second reaction piston element that the deactuation point of the braking force amplifier, from which deactivation point the increase in the actuation force transmitted to the main cylinder corresponds to the increase in the control force which is exerted on the first reaction piston element, can be reached by displacement solely of the first reaction piston element alone.

17. The brake pressure control device according to claim 16, wherein the distance piece is configured as a piston-shaped armature of a control magnet constituting the actuation device, and the armature in the first reaction piston element being engageable against action of a return spring by supplying current to the control magnet, which return spring is configured to force the armature into a disengaged position marked by a stop effect.

18. The brake pressure control device according to claim 17, wherein the first reaction piston element has three piston steps of different diameter, a first of the piston steps on which the pedal push-rod acts directly having the largest diameter and a second of the piston steps directly supported on the reaction disc having the smallest diameter, the control magnet of the switch-over device being arranged within a third of the piston steps arranged centrally between the first and second piston steps, and the second reaction piston element being configured as a two stage annular piston with two cylindrically tubular steps, the smallest-diameter piston step of the first reaction piston element being arranged so that as to be slidable and displaceable in the smaller step of the annular piston, and the central piston step of the first reaction piston element being arranged as so to be slidable and displaceable in the larger step of the second reaction piston element.

* * * * *